US008619561B2

(12) United States Patent
Seo

(10) Patent No.: US 8,619,561 B2
(45) Date of Patent: Dec. 31, 2013

(54) METHOD FOR RECEIVING MULTIMEDIA MESSAGE IN WIRELESS TERMINAL

(75) Inventor: Ho-Sub Seo, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 826 days.

(21) Appl. No.: 11/709,926

(22) Filed: Feb. 22, 2007

(65) Prior Publication Data

US 2007/0211630 A1    Sep. 13, 2007

(30) Foreign Application Priority Data

Feb. 24, 2006  (KR) .................................. 2006-18245

(51) Int. Cl.
*H04L 1/00* (2006.01)
*H04W 4/00* (2009.01)
*H04M 3/42* (2006.01)

(52) U.S. Cl.
USPC ............................. 370/230; 455/466; 455/415

(58) Field of Classification Search
USPC ................... 370/230; 455/466, 415
See application file for complete search history.

(56) References Cited

U.S. PATENT DOCUMENTS

| 2003/0040299 A1* | 2/2003 | Laumen et al. ................ 455/412 |
| 2003/0193967 A1* | 10/2003 | Fenton et al. ................. 370/490 |
| 2004/0148400 A1* | 7/2004 | Mostafa ........................ 709/227 |
| 2005/0064854 A1* | 3/2005 | Jang ............................. 455/415 |
| 2005/0221821 A1* | 10/2005 | Sokola et al. ............. 455/432.3 |
| 2005/0259604 A1* | 11/2005 | Salmi ........................... 370/310 |
| 2009/0047980 A1* | 2/2009 | Wilson ......................... 455/466 |
| 2009/0111433 A1* | 4/2009 | Muhonen et al. ......... 455/414.1 |
| 2011/0092183 A1* | 4/2011 | Wieczorek ................... 455/406 |

FOREIGN PATENT DOCUMENTS

| KR | 1020050018359 A | 2/2005 |
| KR | 1020050029325 A | 3/2005 |
| KR | 1020050088681   | 9/2005 |

* cited by examiner

*Primary Examiner* — Christopher M Brandt
*Assistant Examiner* — Muthuswamy Manoharan
(74) *Attorney, Agent, or Firm* — The Farrell Law Firm, P.C.

(57) ABSTRACT

Disclosed is a method for receiving a multimedia message in a wireless terminal, the method including setting reception reservation information (multimedia message reception reservation information) of the multimedia message; when basic information of the multimedia message is received, analyzing the basic information of the multimedia message; comparing the basic information of the multimedia message with the set multimedia message reception reservation information; and if the basic information of the multimedia message is in accordance with the set multimedia message reception reservation information, receiving the multimedia message.

4 Claims, 6 Drawing Sheets

METHOD FOR RECEIVING MULTIMEDIA MESSAGE IN WIRELESS TERMINAL

This application claims priority to an application entitled "Method for Receiving Multimedia Message In Wireless Terminal" filed in the Korean Intellectual Property Office on Feb. 24, 2006 and assigned Serial No. 2006-18245, the contents of which are incorporated herein by reference.

BACKGROUND OF THE INVENTION

1. Field of the Invention

The present invention relates to a method for receiving a multimedia message in a Multimedia Messaging Service (MMS), and more particularly to a method for setting reservation time for receiving (downloading) a multimedia message, and receiving (downloading) the multimedia message when the reservation time is reached.

2. Description of the Related Art

Wireless terminals are generally used for voice communication and/or a Short Message Service (SMS). In an SMS, it is possible to successfully transmit a desired message regardless of the communication state of another wireless terminal. For example, an SMS message may be sent to a wireless terminal that is currently engaged in a voice communication. Moreover, SMS can be provided at low cost, as compared to a voice communication.

Wireless terminals may provide various supplementary functions in addition to a basic communication function. The various supplementary functions can include a photographing function using a digital camera, a music playback function, and a dynamic image display function. Accordingly, a mobile communication system provides an MMS for transmitting/receiving contents, which relate to the supplementary functions, in the form of a multimedia message. For example, the contents, which are included in the multimedia message transmitted/received through the MMS, may be images, dynamic images, sound source, etc.

In the MMS as described above, if a corresponding content file is transmitted to a Multimedia Messaging Service Center (MMSC), which is a system for controlling the transmission/reception of an MMS in a mobile communication environment, according to MMS transmission standard and transmission capacity (generally, 300 kbytes) determined by a company, the MMSC transmits the received content file to a wireless terminal of a receiver. Hereinafter, an operation for executing the MMS will be described in more detail with reference to FIG. 1.

FIG. 1 is a flow diagram illustrating a conventional multimedia message (MMS message) service method in a mobile communication network. First, an originating wireless terminal 1 creates a multimedia message to be transmitted and uploads the multimedia message to an MMS proxy server 7 through a mobile communication network in step S201. Then, the multimedia message arrives at the MMS proxy server 7, and the MMS proxy server 7 transmits the basic information of the multimedia message to a terminating wireless terminal 5 in step S203. Herein, the basic information of the multimedia message may include originating-side ID information, originating time information, terminating-side ID information, information about the message type, capacity information of attached content, etc. Then, the terminating wireless terminal 5 analyzes the basic information of the multimedia message and reports the reception of the multimedia message on a display (as illustrated in FIG. 6a) in step S205. Further, the terminating wireless terminal 5 requests the reception of a multimedia message according to setup in step S207. Herein, there are three methods for requesting the reception of the multimedia message. The first method is a manual reception request method in which only the basic information of the multimedia message is received, the reception of the multimedia message is reported, and the reception of content information of the multimedia message is requested if a key is input or a menu is selected by a user. The second method is an auto download reception request method in which the reception of the multimedia message is reported when the basic information of the multimedia message is received, and the reception of content information of the multimedia message is requested at the same time. The third method is a reject reception request method for rejecting the reception of the multimedia message.

The terminating wireless terminal 5 transmits the reception request for the multimedia message to the MMS proxy server 7 according to the operation for requesting the reception of the multimedia message in step S209. If the reception (download) request for the multimedia message transmitted from the terminating wireless terminal 5 normally arrives at the MMS proxy server 7, the terminating wireless terminal 5 receives (downloads) the corresponding multimedia message from the MMS proxy server 7 in step S211. If the terminating wireless terminal 5 completely receives (downloads) the corresponding multimedia message in step S213, the terminating wireless terminal 5 transmits a reception (download) completion notification message, which reports that the reception (download) of the corresponding multimedia message has been completed, to the MMS proxy server 7 in step S215.

When the multimedia message (MMS message) service is used by a user, the user typically incurs a service charge. The service charge may change depending on time zones preset by a corresponding mobile communication company. For example, a relatively high service charge may be set for daytime during which the service is actively used, and a low service charge may be set for night during which the service is not actively used.

The multimedia message (MMS message) service as described above does not provide a user receiving the multimedia message with a more detailed reception request method of the multimedia message based on the personal characteristics of the user. Therefore, the user receiving the multimedia message unnecessarily performs data communication, and unconsciously and frequently receives the multimedia message during a time zone in which a service charge is high.

SUMMARY OF THE INVENTION

Accordingly, the present invention has been made to solve the above-mentioned problems occurring in the prior art, and an object of the present invention is to provide a method for setting reception reservation information of a multimedia message and receiving the multimedia message according to the reception reservation information in a wireless terminal.

In accordance with one aspect of the present invention, there is provided a method for receiving a multimedia message in a wireless terminal, the method including setting reception reservation information (e.g., multimedia message reception reservation information) of the multimedia message; when basic information of the multimedia message is received, analyzing the basic information of the multimedia message; comparing the basic information of the multimedia message with the set multimedia message reception reservation information; and if the basic information of the multimedia message coincides with the set multimedia message reception reservation information, receiving the multimedia message.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

A preferred embodiment of the present invention will be described in detail herein below with reference to the accompanying drawings. It should be noted that, in the following description, a detailed description of known functions and configurations incorporated herein will be omitted when it may obscure the subject matter of the present invention.

Figure 1:
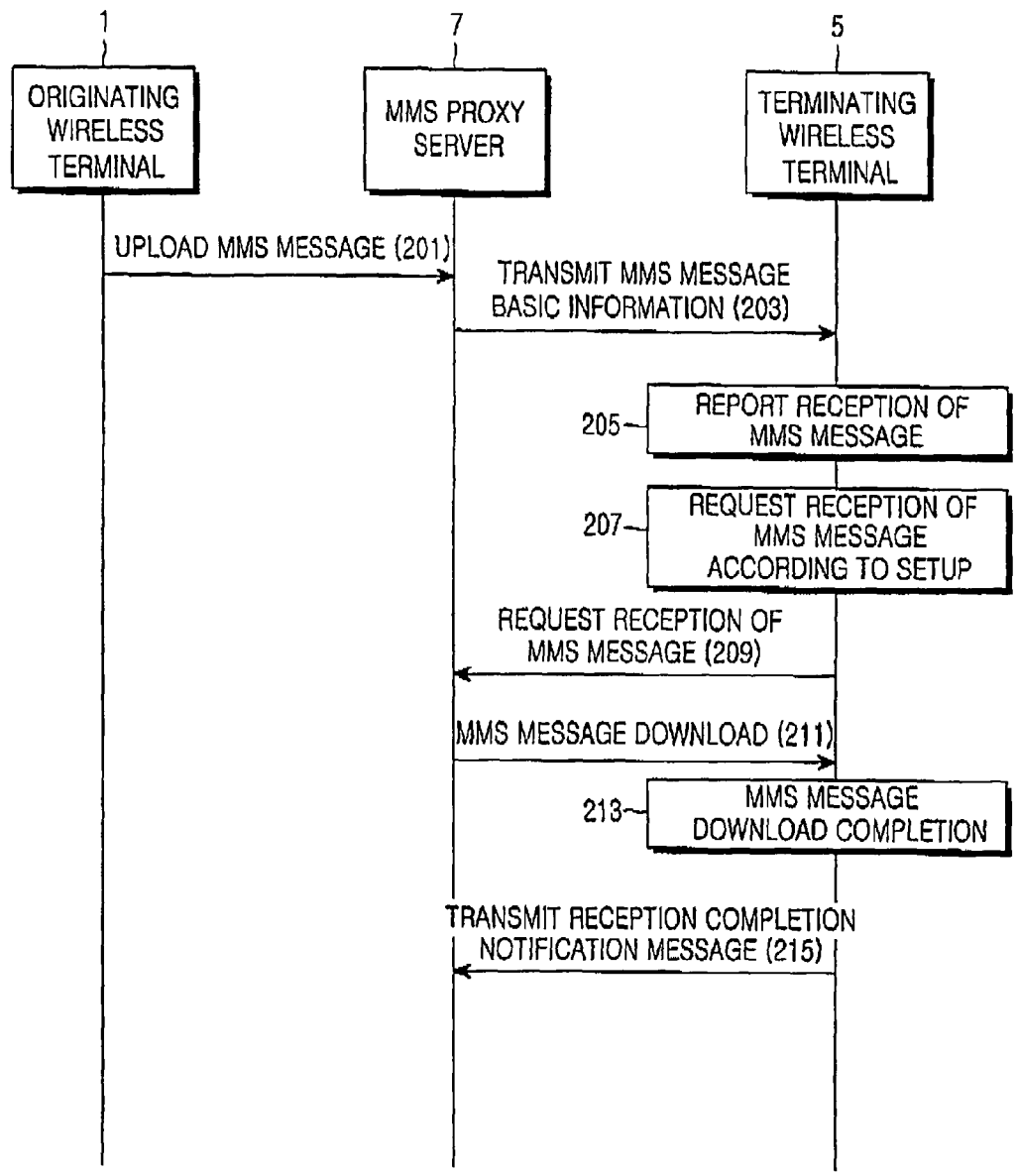
FIG. 1 is a flow diagram illustrating a conventional multimedia message (MMS message) service method in a mobile communication network.
Figure 2:
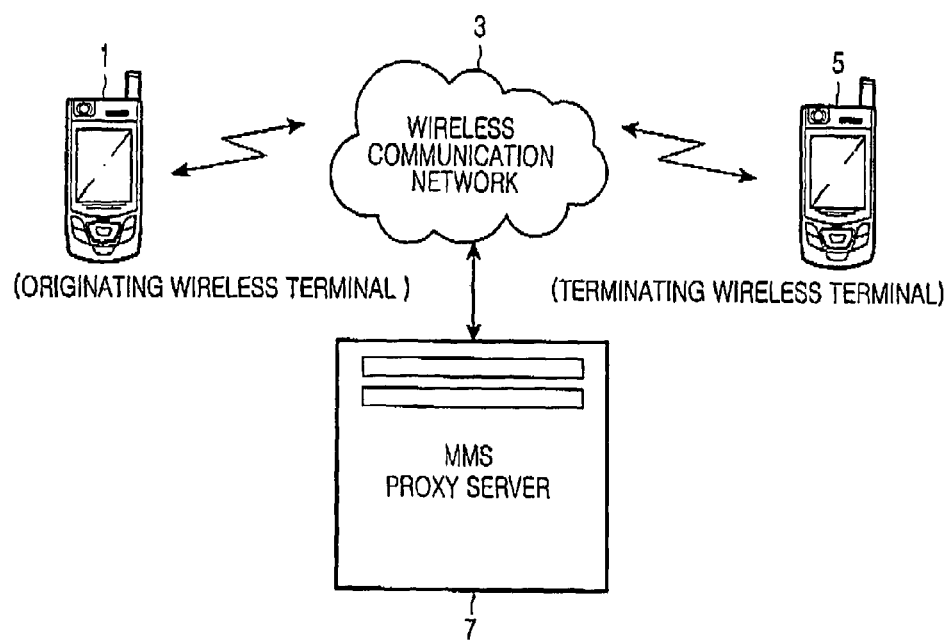
FIG. 2 is a block diagram illustrating the construction of an MMS system according to the present invention.

FIG. 2 is a block diagram illustrating the construction of an MMS system according to the present invention. Hereinafter, the construction and operation of the MMS system will be described with reference to FIG. 2. The MMS system according to the present invention includes a wireless communication network 3, an MMS proxy server 7 interworking with the wireless communication network 3, an originating wireless terminal 1 and a terminating wireless terminal 5. The wireless communication network 3 represents a communication network capable of transmitting a multimedia message including voice, text, image, etc., data inclusive of a Home Location Register (HLR), a Visitor Location Register (VLR), a Base Transceiver Station (BTS), a Base Station Controller (BSC), a Mobile Switching Center (MSC), etc. When the originating wireless terminal 1 creates and transmits a multimedia message, this message is uploaded to the MMS proxy server 7 interworking with the wireless communication network 3, and the MMS proxy server 7 notifies the terminating wireless terminal 5 of the arrival of the multimedia message through multimedia message (MMS message) arrival notification. Further, the terminating wireless terminal 5 receives the multimedia message (MMS message) arrival notification, becomes aware of the fact that the message to be received (downloaded) has arrived, and then receives (downloads) the corresponding message from the MMS proxy server 7 according to the reception (download) request operation for the message.

Figure 3:
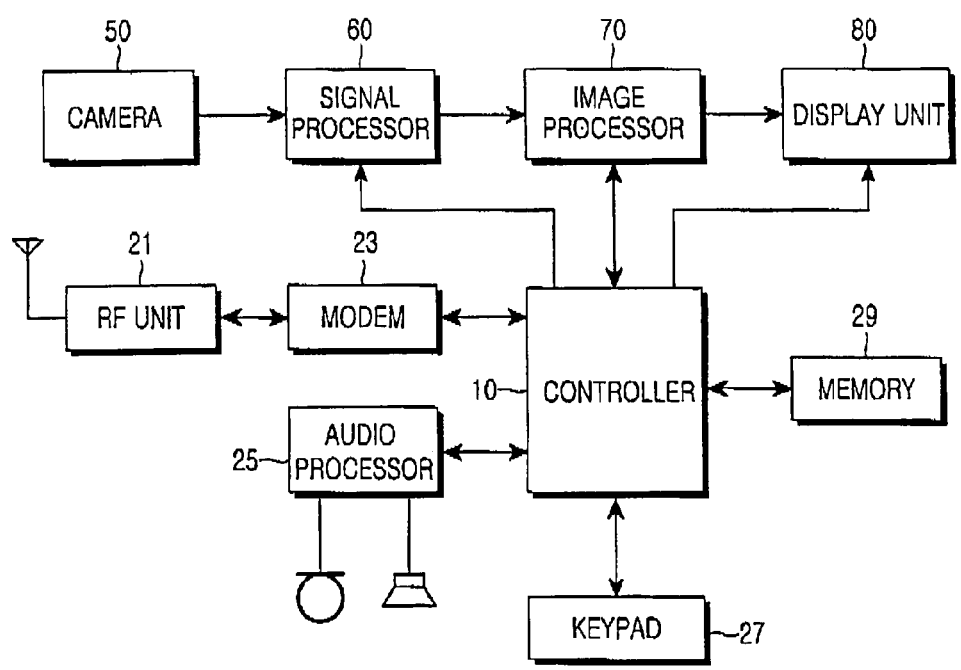
FIG. 3 is a block diagram illustrating the construction of a wireless terminal according to the present invention.

FIG. 3 is a block diagram illustrating the construction of a wireless terminal according to the present invention. Referring to FIG. 3, a Radio Frequency (RF) unit 21 performs communication of a cellular phone. The RF unit 21 includes an RF transmitter for up-converting and amplifying the frequency of transmitted signals, an RF receiver for low-noise amplifying received signals and down-converting the frequency of the received signals, etc.

A modem 23 includes a transmitter for coding and modulating the transmitted signals, a receiver for demodulating and decoding the received signals, etc.

An audio processor 25 may include a coder/decoder (CODEC). The CODEC includes a data codec for processing packet data, etc., and an audio CODEC for processing audio signals such as voice. The audio processor 25 converts digital audio signals received through the modem 23 into analog signals through the audio CODEC for reproduction, or converts analog audio signals generated from a microphone into digital audio signals through the audio CODEC and transmits the digital audio signals to the modem 23. The CODEC may be separately provided or integrated with a controller 10.

A keypad 27 includes keys for inputting numeral and/or character information and/or function keys for setting various functions. Further, the key input unit 27 may have a multimedia message (MMS message) reception reservation setup key, etc., according to the present invention.

A memory 29 may include a program memory and a data memory. The program memory stores programs for controlling general operations of the wireless terminal. The data memory temporarily stores data generated during the execution of the programs. According to the present invention, multimedia message reception reservation information may be set in the program memory, and programs necessary for downloading the multimedia message based on the set multimedia message reception reservation information may be stored in the program memory.

The controller 10 performs a function of controlling the overall operation of the wireless terminal. For example, the controller 10 may control the operation of the modem 23 and the CODEC. According to the present invention, if the multimedia message reception reservation setup key is input, the controller 10 controls a reception reservation setup window to be displayed. If originating-side information and multimedia message reception reservation time information are input, the controller 10 controls the input originating-side information and multimedia message reception reservation time information to be displayed on the reception reservation setup window. If a setup key is input, the controller 10 sets the displayed originating-side information and multimedia message reception reservation time information as the multimedia message reception reservation information. If the basic information of a multimedia message is received, the controller 10 analyzes the basic information of the multimedia message, and compares the basic information of the multimedia message with the set multimedia message reception reservation information. As a result of the comparison, if the basic information of the multimedia message corresponds with the set multimedia message reception reservation information, the controller 10 controls the multimedia message to be received (downloaded).

An optional camera may 50 include a camera sensor for photographing image data and converting photographed optical signals into electric signals. It is assumed that the camera sensor is a Charge-Coupled Device (CCD) sensor.

A signal processor 60 may convert signals output from the camera 50 into image signals. The signal processor 60 may be realized by a Digital Signal Processor (DSP).

An image processor 70 generates screen data for displaying image signals output from the signal processor 60. The image processor 70 transmits the received image signals according to the standard of a display unit 80 under the control of the controller 10, and compresses and/or decompresses the image data. Further, the image processor 70 transmits the start address value of the image data displayed on the display unit 80, and differently sets and transmits the start address value under the control of the controller 10.

The display unit 80 displays the image data output from the image processor 70. The display unit 80 may include a Liquid Crystal Display (LCD). In this case, the display unit 80 may include an LCD controller, a memory capable of storing image data, an LCD display device, etc. The LCD may also include a touch screen function, in which case the LCD may operate as an input unit. The display unit 80 includes an image data display unit to which the image data are output.

Hereinafter, an operation of the wireless terminal will be described with reference to FIG. 3. When a call is originated, if a user performs a dialing operation through the keypad 27 and sets an originating mode, the controller 10 detects the setup of the originating mode, processes dial information received through the modem 23, converts the dial information into RF signals through the RF unit 21, and outputs the RF signals. Then, if response signals are received from a communication partner (i.e., another party such as the called party of the calling party), the controller 10 detects the reception of the response signals through the RF unit 21 and the modem 23. Then, a voice speech path is formed through the audio processor 25, so that the user performs a communication function. Further, in a terminating mode, the controller 10 detects the terminating mode through the modem 23 and generates ring signals through the audio processor 25. Then, if a user responds to the ring signals, the controller 10 detects the user's response. Accordingly, a voice speech path is formed through the audio processor 25 as in the above case, so that the user performs a communication function. In the originating mode and the terminating mode, voice communication is described as an example. However, in addition to the voice communication, data communication for transmitting/receiving packet and image data may also be performed. Further, in the case of a waiting mode or text communication, the controller 10 may display text data processed through the modem 23 on the display unit 80.

Hereinafter, an operation for setting the multimedia message reception reservation information and receiving the multimedia message according to the set multimedia message reception reservation information in the wireless terminal as described above will be described. If the multimedia message reception reservation information is set at a user's request and the basic information of a multimedia message is received, the controller 10 analyzes the basic information of the multimedia message, and controls the memory 29 and compares the basic information of the multimedia message with the set multimedia message reception reservation information. As a result of the comparison, if the basic information of the multimedia message coincides with the set multimedia message reception reservation information, the controller 10 controls the RF unit 21 to receive the multimedia message.

Figure 4:
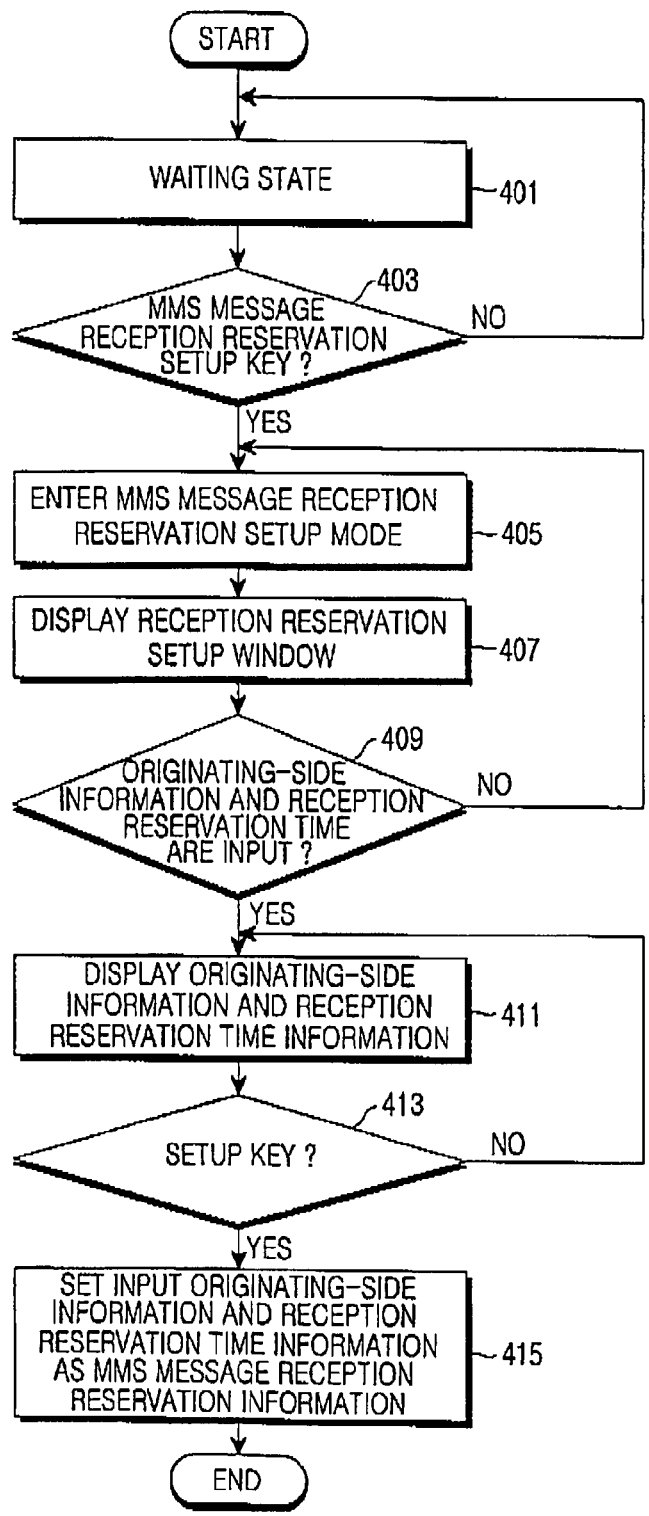
FIG. 4 is a flow chart illustrating an operation for setting multimedia message reception reservation in a wireless terminal according the present invention.

FIG. 4 is a flow chart illustrating an operation for setting multimedia message reception reservation in the wireless terminal according to the present invention. Hereinafter, an operation for setting multimedia message reception reservation information in the wireless terminal will be described with reference to FIG. 4. If a user inputs the multimedia message (MMS) reception reservation setup key by using the keypad 27 in step 401 (waiting state), the controller 10 detects the input of the setup key in step 403. In step 405, the controller 10 enters a multimedia message reception reservation information setup mode. In step 407, the controller 10 controls the memory 29 and the display unit 80 to display a multimedia message reception reservation setup window. The multimedia message reception reservation setup window has an area to which both originating-side ID information and information (time information) about time, at which the multimedia message is to be received, can be input.

If the user inputs the originating-side ID information and the time information by using the keypad 27, the controller 10 detects the input of the originating-side ID information and the time information in step 409. In step 411, the controller 10 controls the memory 29 and the display unit 80 to display the input originating-side ID information and time information on the multimedia message reception reservation setup window.

Then, if the user inputs the setup key by using the keypad 27, the controller 10 detects the input of the setup key in step 413. In step 415, the controller 10 controls the memory 29 and sets the input originating-side ID information and time information as the multimedia message reception reservation information. For example, if the user inputs the originating-side ID information "8201012345678" and the time information "19:00 to 20:00" and inputs the setup key by using the keypad 27, the controller 10 sets the input originating-side ID information "8201012345678" and time information "19:00 to 20:00" as the multimedia message reception reservation information. Herein, the multimedia message reception reservation information corresponds to information applied to a multimedia message reservation reception function. When the multimedia message reservation reception function is performed, a multimedia message transmitted from the originator "8201012345678" is received (downloaded) at the time "19:00 to 20:00", regardless of originating time.

Figure 5:
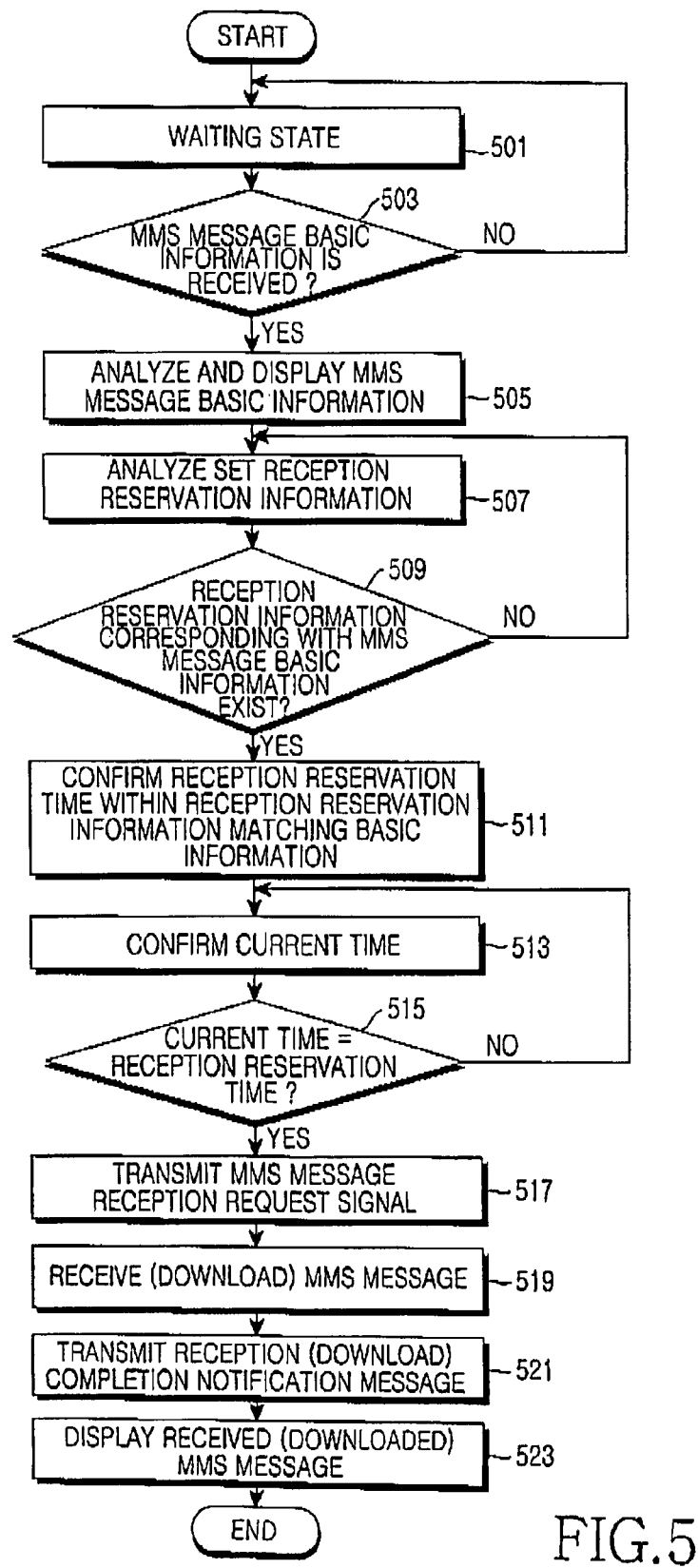
FIG. 5 is a flow chart illustrating an operation for receiving a multimedia message in a wireless terminal according to the present invention.
Figure 6A:
FIG. 6A and 6B are screen shots a diagram illustrating message reception operations in a wireless terminal according to a conventional method and the present invention, respectively.
Figure 6B:
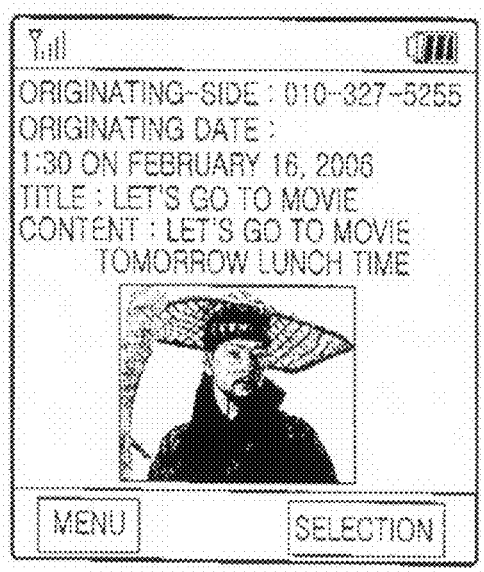

FIG. 5 is a flow chart illustrating an operation for receiving a multimedia message in the wireless terminal according to the present invention, and FIGS. 6A-6B are screen shots illustrating message reception operations in the wireless terminal according to and the present invention, respectively. Hereinafter, an operation for receiving the multimedia message according to the set multimedia message reception reservation information in the wireless terminal will be described with reference to FIGS. 5 and 6. In the following description, it is assumed that the reception request method of a multimedia message has been set as a reception reservation method.

If the basic information of a multimedia message is received from the RF unit 21 in step 501 (waiting state), the controller 10 detects the reception of the basic information in step 503. In step 505, the controller 10 controls the memory 29 and the display unit 80, analyzes the basic information of the multimedia message, and reports (via a notification display) the reception of the multimedia message as illustrated in FIG. 6A. The basic information of the multimedia message includes originating-side ID information, originating time information, terminating-side ID information, information about the message type, capacity information of attached contents, etc.

In step 507, the controller 10 controls the memory 29 and analyzes the preset multimedia message reception reservation information. The multimedia message reception reservation information corresponds to information set in the multimedia message reservation reception function, and includes originating-side ID information and information (such as time information) about the time at which the multimedia message is to be received. According to the multimedia message reservation reception function, a multimedia message transmitted from the set originating-side ID is received at the time information, regardless of originating time.

In step 509, the controller 10 controls the memory 29 and determines if there exists the multimedia message reception reservation information corresponding with the basic information of the multimedia message. As a result of the determination, if there exists the multimedia message reception reservation information corresponding with the basic information of the multimedia message, step 511 is performed. In step 511, the controller 10 controls the memory 29 and confirms reception reservation time information within the multimedia message reception reservation information. In step 513, the controller 10 confirms the current time. In step 515, the controller 10 compares the current time with the reception reservation time information. As a result of the comparison, if the current time corresponds with the reception reservation time information, step 517 is performed. In step 517, the controller 10 controls the RF unit 21 and the memory 29 and transmits multimedia message reception (multimedia message retrieve: download) request signals to the MMS proxy server 7.

In step 519, the controller 10 controls the memory 29 and receives (downloads) the corresponding multimedia message transmitted from the MMS proxy server 7. If the reception (download) of the corresponding multimedia message is completed, the controller 10 controls the RF unit 21 to transmit a reception (download) completion notification message, which reports that the reception (download) of the corresponding multimedia message has been completed, to the MMS proxy server 7 in step 521.

In step 523, the controller 10 controls the memory 29 and the display unit 80 and displays the received (downloaded) multimedia message as illustrated in FIG. 6B.

As described above, the present invention provides a method for setting multimedia message reception reservation information and receiving a multimedia message according to the reception reservation information in the wireless terminal, so that it is possible to reduce unnecessary data calls such as advertisement messages through the setup of the reception reservation information, and it is possible to receive a multimedia message in a desired time zone. Consequently, it is possible to more efficiently manage service charges due to the reception of the multimedia message.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for receiving a multimedia message in a wireless terminal, the method comprising the steps of:
    displaying a reception reservation setup menu, when a setup key of the wireless terminal is input;
    receiving originating-side information and a correponding reception reservation time range for a multimedia message reception reservation in the reception reservation setup menu;
    storing the multimedia message reception reservation;
    when basic information of a multimedia message is received, analyzing the basic information of the multimedia message and displaying an arrival notification of the multimedia message regardless of the basic information and a current time;
    comparing the basic information of the multimedia message with one or more set multimedia message reception reservations;
    if the basic information of the multimedia message corresponds with a set multimedia message reception reservation, comparing the current time with a reception reservation time range of the set multimedia message reservation information;
    if the current time is within the reception reservation time range, downloading the multimedia message; and
    if the current time is not currently within the reception reservation time range, waiting until the current time is within the reception reservation time range before downloading the multimedia message;
    wherein the multimedia message is only downloaded when both the basic information of the multimedia message corresponds with the set multimedia message reception reservation and the current time is within the reception reservation time range.

2. The method as claimed in claim 1, wherein the basic information of the multimedia message comprises originating-side ID information, originating time information, terminating-side ID information, information about a message type, and capacity information of attached contents.

3. The method as claimed in claim 1, wherein the step of comparing the basic information of the multimedia message with the set multimedia message reception reservation information comprises:
    determining if the set multimedia message reception reservation corresponding with the basic information of the multimedia message exists.

4. The method as claimed in claim 1, wherein the step of downloading the multimedia message comprises:
    transmitting signals for requesting download of the multimedia message to a Multimedia Messaging Service (MMS) proxy server;
    downloading the corresponding multimedia message from the MMS proxy server;
    if download of the corresponding multimedia message is completed, transmitting a download completion notification message, which reports that the download of the corresponding multimedia message has been completed, to the MMS proxy server; and displaying the received multimedia message.

* * * * *